United States Patent [19]

Inoue

[11] 4,455,469
[45] * Jun. 19, 1984

[54] METHOD AND APPARATUS FOR EDM WITH LATERALLY VIBRATED TOOL ELECTRODE

[75] Inventor: Kiyoshi Inoue, Tokyo, Japan

[73] Assignee: Inoue-Japax Research Incorporated, Yokohama, Japan

[*] Notice: The portion of the term of this patent subsequent to Dec. 21, 1999 has been disclaimed.

[21] Appl. No.: 307,949

[22] Filed: Oct. 2, 1981

[30] Foreign Application Priority Data

Oct. 8, 1980 [JP] Japan ................ 55-139867

[51] Int. Cl.³ .................... B23P 1/12
[52] U.S. Cl. ............... 219/69 M; 204/129.7; 219/69 V
[58] Field of Search ........... 219/69 M, 69 V; 204/129.7

[56] References Cited

U.S. PATENT DOCUMENTS 3,717,567  2/1973  Bodine ................. 219/69 V
4,044,216  8/1977  Check et al. ........... 219/69 E
4,365,133 12/1982  Inoue .................. 219/69 V

FOREIGN PATENT DOCUMENTS 45-40405 12/1970 Japan ................. 219/69 V
2060459  5/1981 United Kingdom .
2061793  5/1981 United Kingdom .
2080176  2/1982 United Kingdom .
2089267  6/1982 United Kingdom .

*Primary Examiner*—B. A. Reynolds
*Assistant Examiner*—Alfred S. Keve
*Attorney, Agent, or Firm*—Karl F. Ross; Herbert Dubno

[57] ABSTRACT

A method of and apparatus for electroerosively machining a 3-dimensional cavity in a workpiece with a slender, preferably tubular and continuous, tool electrode whose contour is generally independent in shape of the desired cavity. A horn-type sonic or ultrasonic assembly or a motor-driven mechanical reciprocation unit is used to laterally oscillate the slender electrode to cause the machining tip portion thereof to oscillatorily move at a rate of movement, preferably in excess of 5 m/minute, substantially in a plane normal to the electrode axis. The machining liquid is pumped into the tubular electrode and delivered therethrough into the machining gap at a pressure in excess of 10 kg/cm². Feed means produces a 3D relative displacement of the electrode axis and the workpiece to cause the laterally oscillating electrode tip to sweep in a scanning manner three-dimensionally over the workpiece while successive electrical discharges are produced between the laterally oscillating electrode tip and the workpiece and the machining gap therebetween flooded with the machining liquid is maintained substantially constant in size.

26 Claims, 6 Drawing Figures

FIG. I

METHOD AND APPARATUS FOR EDM WITH LATERALLY VIBRATED TOOL ELECTRODE

FIELD OF THE INVENTION

The present invention relates generally to electroerosion and, more particularly, to a method of and apparatus for electroerosively machining a 3D (three-dimensional) cavity in a workpiece by using a slender electrode, e.g. a wire or thin rod or pipe electrode, whose contour is generally independent in shape of the desired cavity. The term "electroerosion" and "electroerosive machining" is used herein to refer to a machining process whereby material is removed from a workpiece juxtaposed with a tool electrode by means of the actions of successive, time-spaced electrical discharges therebetween which action may partially include action of an electrolytic or electrochemical stock removal nature.

BACKGROUND OF THE INVENTION

It has generally been accepted that the electroerosion technique, when applied to the machining of a 3D cavity in a workpiece, commonly requires a tool electrode three-dimensionally shaped to conform to the desired cavity in the workpiece. Thus, a conventional sinking-type or 3D EDM electrode may be a precision-machined conductive block or a sheet metal precision-deformed or plated precision-electroforming mold. Furthermore, a multiplicity of such electrodes of identical or similar configuration must be prepared in order to compensate for the wear which the electrodes suffer during the erosion process or in the interest of minimizing the machining time to achieve the end of a desired machined precision and surface finish. Preparation of such precision-formed and multiple electrodes is generally time-consuming and laborious and entails considerable skill and labor and, as a consequence, may make a desired EDM job unduly costly or often even impractical. Furthermore, the conventional sinking-type operation makes it difficult to keep the machining gap free from the debris of machined chips and other products which tend to cause machining instability.

OBJECTS OF THE INVENTION

It is accordingly a general object of the present invention to provide an improved method of electroerosively machining a 3D cavity in a workpiece.

Another object of the invention is to provide an electroerosion method of machining a 3D cavity whereby the desired cavity can be formed in a workpiece with a simple electrode tool.

Still another object of the invention is to provide an electroerosion method which is capable of yielding a desired 3D cavity in a workpiece with an increased efficiency.

A further object of the invention is to provide an improved apparatus for electroerosively machining a 3D cavity in a workpiece.

A still further object of the invention is to provide an electroerosion apparatus whereby a desired 3D cavity can be formed in a workpiece with a simple electrode tool arrangement.

Yet a further object of the invention is to provide an electroerosion apparatus which is capable of yielding a desired 3D cavity in a workpiece with an increased efficiency.

SUMMARY OF THE INVENTION

The invention provides, in a first aspect thereof, a method of electroerosively machining a 3D cavity in a workpiece, which method comprises the steps of: axially juxtaposing a slender tool electrode of which the shape is generally independent of the shape of the desired cavity with the workpiece to define between a tip portion of the slender electrode and the workpiece a machining gap flooded with a machining liquid; laterally oscillating the slender electrode to cause the tip portion thereof to oscillatorily move with a small amplitude in a plane substantially normal to the axis of the slender electrode; effecting a succession of electrical discharges between the oscillatorily moving tip portion and the workpiece through the liquid flooded machining gap to electroerosively remove material from the workpiece; and effecting a three-dimensional relative displacement of the axis of the laterally oscillating slender electrode and the workpiece to cause the said tip portion to oscillatorily sweep in a scanning manner three-dimensionally over the workpiece while maintaining the machining gap therebetween substantially constant in size.

Specifically, the rate of the oscillatory movement imparted to the tip portion should preferably range in excess of 5 meters/minute or 8.3 cm/second. It has been found that this gives rise to a marked increase in removal rate over the system in which no such oscillatory movement is imparted to the slender electrode.

Preferably, the slender electrode is tubular or constituted in the form of a pipe, preferably continuous, that is formed with an internal bore open to the machining gap for delivering into the latter a high velocity stream of the machining liquid under an elevated pressure in excess of 10 kg/cm$^2$, preferably in excess of 50 kg/cm$^2$. The machining liquid is preferably constituted as a water liquid having a specific resistance in the range between 10$^3$ and 10$^5$ ohm-cm. It has been found that this arrangement leads to an extremely stabilized machining operation.

In accordance with a corollary feature of the invention, the tool electrode is constituted by a plurality of slender electrode elements, i.e. wires or thin rods or pipes, arranged in parallel with one another and securely held together with a support member. Such elementary electrodes are advantageously arranged so as to have their individual tips in an alignment normal to their longitudinal axes. The elementary electrodes advantageously have a thickness of 0.05 to 1 mm and are spaced apart from one another preferably with a distance of 0.05 to 0.5 mm or about one-half the thickness or diameter of the individual elementary electrodes. Here again, the individual electrode elements should preferably be tubular or constituted each in the form of a pipe, preferably continuous, that is formed with an internal bore open to the machining gap, for delivering into the latter high-velocity streams of the machining liquid under an elevated pressure.

The invention provides, in a second aspect thereof, an apparatus for electroerosively machining a 3D cavity in a workpiece, which apparatus comprises: a slender tool electrode of which the shape is generally independent of the shape of the desired cavity and adapted to be axially juxtaposed with the workpiece to form between a tip portion of the slender electrode and the workpiece a machining gap flooded with a machining liquid; means for laterally oscillating the slender electrode to cause the said tip portion to oscillatorily move with a small amplitude in a plane substantially normal to the axis of the slender electrode; power supply means electrically connectable to the slender electrode and the workpiece for effecting successive electrical discharges between the oscillatorily moving tip portion and the workpiece through the liquid flooded machining gap to electroerosively remove material from the workpiece; and feed means for effecting a three-dimensional relative displacement of the axis of the laterally oscillating slender electrode and the workpiece to cause the said tip portion to oscillatorily sweep in a scanning manner three-dimensionally over the workpiece while maintaining the machining gap therebetween substantially constant in size.

Specifically, the said means for laterally oscillating the slender electrode is adapted to cause the tip portion thereof to oscillatorily move at a rate of movement in excess of 5 meter/minute or 8.3 cm/second one- or two-dimensionally in a plane substantially normal to the axis of the slender electrode. This means may comprise an electromechanical transducer energizable by a high-frequency power supply for imparting a sonic or ultrasonic vibration induced therein to the slender electrode via a horn amplifier of conventional design. The horn amplifier is oriented transversely to the axis of the slender electrode and arranged to laterally oscillate it. Two such horn amplifiers may be provided having individual electromechanical transducers and may be oriented mutually at right angles transversely to the axis of the slender electrode. With this latter arrangement, the tip portion of the slender electrode acquires a circular or two-dimensional oscillatory movement of a small amplitude. The amplitude of one- or two-dimensional oscillatory movement of the tip portion of the slender electrode may range between 10 micron and 1 mm and preferably at most 0.5 mm.

The said means for laterally oscillating may alternatively comprise one or two motors drivingly coupled to a support member for the slender electrode each via a feed screw transmission. Such one or two motors are operative to reciprocatingly rotate so as to reciprocatingly move the slender electrode laterally along one given axis, e.g. x-axis or another given axis, e.g. y-axis orthogonal to the x-axis, or along two (e.g. x- and y-) axes. In this manner, one- or two-dimensional oscillatory movement of the slender electrode may be achieved.

BRIEF DESCRIPTION OF THE DRAWING

These and other features and advantages of the present invention will become more readily apparent from the following description of certain preferred embodiments thereof made with reference to the accompanying drawing in which.

SPECIFIC DESCRIPTION

Figure 1:
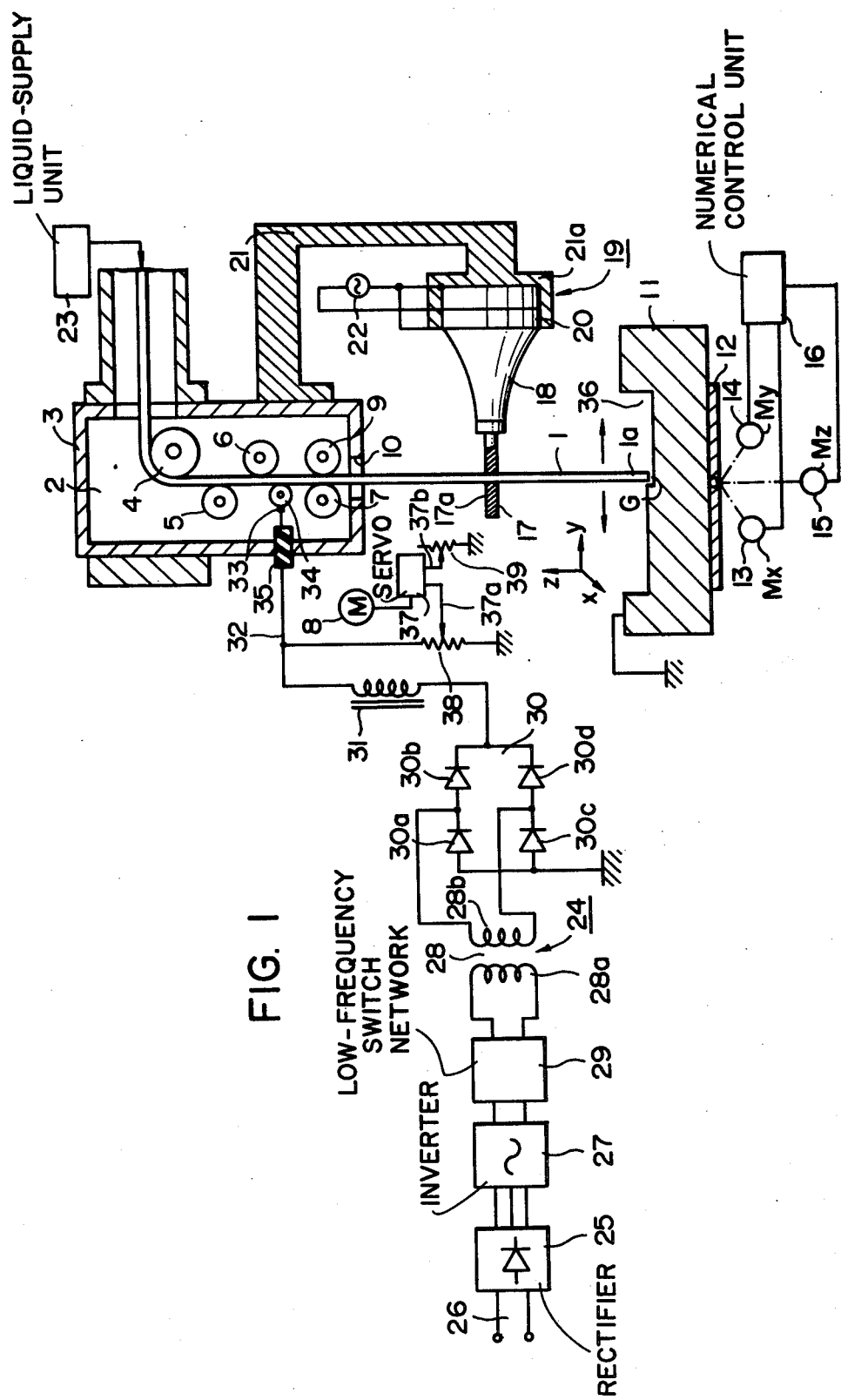
FIG. 1 is a schematic, partly sectional diagram of an apparatus according to the present invention.
Figure 5:
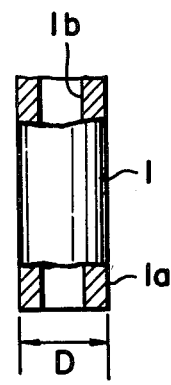
FIG. 5 is an enlarged side view, partly broken away and in section, diagrammatically illustrating a portion of a slender tool electrode or electrode element continuous or of a fixed length for use with any one of apparatuses shown in FIGS. 1, 2, 3 and 4.

The apparatus shown in FIG. 1 makes use of a slender tool electrode 1 in the form of a continous wire or thin rod which is preferably tubular as shown in FIG. 5 and is composed of, say, copper or brass. The slender tool electrode 1 is sufficiently thin, having a diameter D ranging between 0.05 and 1 mm, and is arranged to be fed from a supply (not shown) and led into and through a space 2 in a tool head 3. A plurality of guide rollers 4, 5 and 6 are arranged in the tool head 3 to allow the slender electrode 1 to extend and be advanced along a straight vertical path or Z-axis in a prescribed 3D orthogonal coordinate system. A capstan 7 driven by a motor 8 and a pinch roller 9 are also arranged within the tool head 3 to advance the continuous electrode 1 along the aforesaid path out of an opening 10 of the tool head 3 towards a workpiece 11 which is securely mounted on a worktable 12 so as to be displaceable therewith in an X-Y plane and also along the Z-axis of the coordinate system. The worktable 11 is a conventional cross-feed arrangement movable by an X-axis motor 13, a Y-axis motor 14 and a Z-axis motor 15 which are operable in response to drive signals furnished from a numerical control (NC) unit 16. The latter has stored therein preprogrammed data representing a desired path of 3D displacement of the workpiece 11. In operation, the stored data are reproduced to yield a sequence of drive pulses for driving the motors 13, 14 and 15 to cause the workpiece 11 to move along the desired 3D feed path.

In the aforesaid vertical path, the slender electrode 1 is also slidably guided in an aperture 17a of a metal bar 17 which extends horizontally and at right angles with the path and which is secured to the tip of a horn 18 of a sonic or ultrasonic vibtation system 19 of conventional design. The horn body 18 extending horizontally and coaxially with the metal bar 17 has an electromechanical transducer 20 which is secured thereto and is held in a cup-shaped support member 21a which is, in turn, secured to the tool head 3 by means of an L-shaped arm 21. The transducer 20 is energized by a power supply 22 to induce therein a sonic or ultrasonic vibration of a frequency in the range, e.g., between 1 and 50 kHz, which is transmitted via the amplifier horn 18 to the bar 17 to laterally oscillate the slender electrode 1. This will cause the tip portion 1a of the slender electrode 1 axially juxtaposed with the workpiece 11 to oscillatorily move with a small amplitude, e.g., from 1 to 50 microns in an x-y plane normal to the electrode axis.

The slender electrode 1 when tubular or in the form of a continuous pipe is fed with a machining liquid at its supply side from a liquid pumping unit 23 to produce a high-velocity stream of the machining liquid through its internal bore 1b (FIG. 5) and deliver it under an elevated pressure preferably in excess of 10 kg/cm$^2$ and even more than 30 or 50 kg/cm$^2$ through its open-ended machining tip 1a into the machining gap G formed between the electrode tip 1a and the workpiece 11. When the slender electrode 1 is solid or non-tubular, one or more nozzles are provided and oriented to direct the machining liquid into the region of the machining gap. The machining liquid may be a liquid hydrocarbon as is typical in sinking-type EDM but should preferably be a water liquid having a specific resistance ranging between $10^3$ and $10^5$ ohm-cm.

An EDM power supply is generally designated at 24 and comprises a converger 25 for rectifying a commercial alternating current available at an input 26 into a direct current, an inverter 27 for converting the direct current into a train of high-frequency pulses of a frequency, say, 1 MHz which are applied to the primary 28a of a high-frequency transformer 28. A low-frequency switching network 29 is provided between the invert 27 and the transformer primary 28a to periodically interrupt the high-frequency pulses at a low frequency, e.g., 1 to 100 kHz. A succession of time-spaced trains of high-frequency pulses thus develop at the transformer primary 28a and then at the secondary 28b with a desired voltage level. A full-wave rectifier 30 constituted by four diodes 30a–30d is connected to the secondary 28b of the high-frequency transformer 28 and has a pair of output terminals one of which is connected to ground. The other output terminal of the rectifier 30 is connected via a DC reactor 31 and a conductor 32 to a conducting brush 33 held in sliding contact with an electrically conductive rotary wheel 34 which is in turn held in sliding contact with the slender electrode 1 within the space 2 of the tool head 3. An electrical insulation 35 is provided where the conductor 32 is led into the space 2 through a metallic wall of the tool head 3. The workpiece 11 is electrically connected to ground. Thus, a succession of time-spaced trains of unidirectional EDM pulses of adjusted pulse parameters are applied between the slender electrode 1 and the workpiece 11 to produce successive time-spaced trains of electrical discharges between the laterally oscillating tip portion 1a of the slender electrode 1 and the workpiece 11 through the machining gap G flooded with the machining liquid, thereby electroerosively removing material from the workpiece 11.

As material removal proceeds, the worktable 12 is displaced by the motors 13 and 14 in response to drive signals from the NC unit 16 to displace the workpiece 11 in the X-Y plane along a predetermined 3D movement path. This will cause the laterally oscillatorily moving tip portion 1a of the slender electrode to sweep in a scanning manner three-dimensionally over the workpiece 11 to produce therein a desired machining cavity 36 with an extremely high efficiency and with precision. Increased machining stability results from the fact that removal of machining chips and other gap contaminants is promoted by the lateral oscillatory movement of the electrode tip 1a. Furthermore, it has been found that discharge craters on the workpiece surface when machined in this manner are uniform and of reduced height, presenting an extremely fine surface finish.

The motor 8 for driving the capstan 7 is operated by a servo-control circuit 37 which has a signal input terminal 37a and a reference input terminal 37b. The signal input terminal 37a is connected to pick up a gap voltage which appears at a sensing resistor 38 connecting the conductor 32 to ground. The reference input terminal 37b is connected to a resistor 39 which is in turn connected to ground. A voltage difference develops across the signal and reference input terminals 37a and 37b to cause the servo circuit 37 to provide a controlled drive signal which is applied to the motor 8. In this manner, the slender electrode 1 is controlledly advanced to compensate for the wear of the tip portion 1a while maintaining the machining gap G between the laterally oscillating tip portion 1a and the workpiece 11 in size substantially constant essentially in the direction of the vertical or Z-axis during the entire course 3D machining operation.

In the arrangement of FIG. 1, it should be noted that two such vibration units as shown at 19 may be provided. In that case, one unit is arranged to impart a lateral oscillation to the slender electrode 1 in a direction normal to an X-Z plane as shown and the other unit is arranged to impart a lateral oscillation to the electrode 1 in a direction normal to a Y-Z plane.

Figure 2:
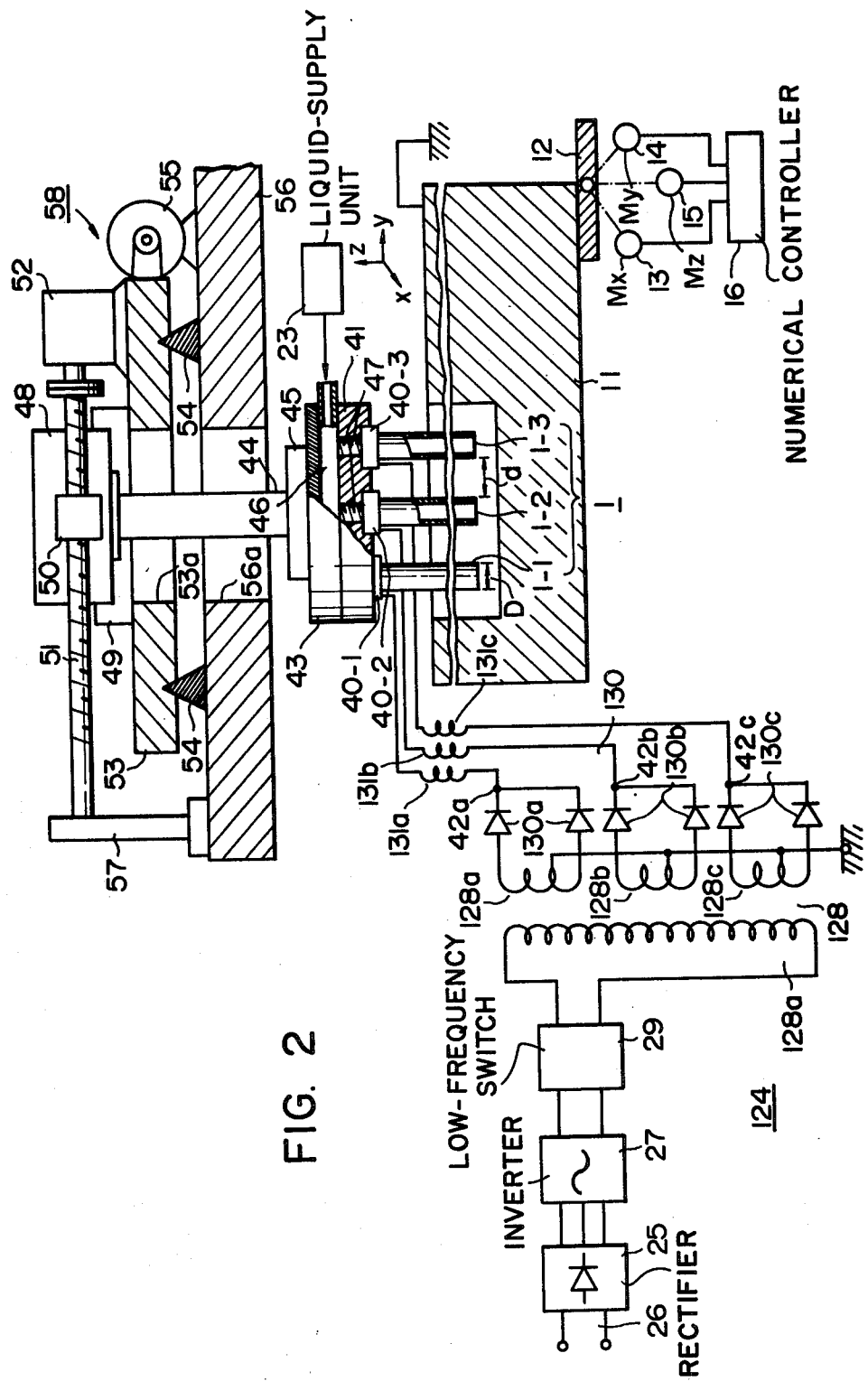
FIG. 2 is a schematic diagram illustrating another form of apparatus embodying the present invention.

In the arrangement of FIG. 2, the electrode tool is constituted by a plurality of slender elementary electrodes shown at 1-1, 1-2 and 1-3, which here again are tubular and which have individually a diameter D ranging between 0.05 and 1 mm and are spaced apart with a distance d ranging between 0.05 and 1 mm. Preferably, the distance d is about one-half the diameter D. The multiple electrodes 1-1, 1-2 and 1-3 are individually fitted in metal rings 40-1, 40-2 and 40-3, respectively, which are, in turn, fitted securely in an insulating plate 41. The metal rings 40-1, 40-2 and 40-3 form current conductors for the tubular elementary electrode 1-1, 1-2 and 1-3 and are energized by multiple output terminals of an EDM power supply 124.

The power supply 124 is here again fed by the output terminals 26 of commercial AC power source. The converter 25 rectifies the AC output into a DC power which is converted by the inverter 27 into a succession of high-frequency pulses. A low-frequency switching network 29 periodically interrupts the latter pulses at a low frequency, thereby producing a succession of time-spaced trains of high-frequency pulses which are applied to the primary of a high-frequency transformer 128. The transformer 128 is here provided with a plurality of secondary windings 128a, 128b and 128c whose center taps are connected commonly to ground. The two ends of each of these plural secondary windings are connected together via rectifiers 130a, 130b, 130c at a junction 42a, 42b, 42c, the junctions being connected to the ring conductors 40-1, 40-2 and 40-3 via inductors 131a, 131b and 131c, respectively. The workpiece 11 is here again electrically connected to ground. As a result, a succession of time-spaced trains of high-frequency pulses develops individually between each of the elementary electrodes 40-1, 40-2 and 40-3 and the workpiece 11. The workpiece 11 is carried on a worktable (here not shown) and displaced three-dimensionally in a manner as already described.

The insulating plate 41 supporting the elementary electrodes 1-1, 1-2 and 1-3 is secured to a cup-shaped member 43 which is in turn secured to a spindle 44 by means of a ring 45. A compartment 46 formed in the member 43 has an opening 46a communicating with a source of the machining liquid 23 and has its function to temporarily store the machining liquid and to distribute it into the plural elementary electrodes 1-1, 1-2 and 1-3 via passageways 47 formed in the plate 41. The liquid source 23 includes a pump to pressurize the machining liquid in the compartment 46, thereby causing it to pass through each tubular electrode 1-1, 1-2, 1-3 and to be pumped into the machining gap at a high flow velocity and with an elevated pressure in the range previously described.

The spindle 44 is secured at its top to a carriage 48 movable slidably on parallel rails 49 which extend orthogonally to an X-Z plane. The carriage 48 has a feed nut 50 secured thereto and in mesh with a feed screw 51 driven by a motor 52 securely mounted on a drive table 53 which has also the rails 49 securely seated thereon. The drive table 53 is in turn movable slidably on parallel rails 54 extending orthogonal to a Y-Z plane and is driven by a motor 55. The latter and the parallel rails 54 are securely seated on a table 56. A post 57 is securely mounted on the table 56 and journals the feed screw 51 thereon above the drive table 53 in an X-Y plane. The elements 48–57 are generally designated by reference numeral 58 which represents a lateral oscillation drive system which may be substituted for the drive system 19 shown in FIG. 1 in practicing the present invention. The tables 53 and 56 are each formed with a central opening 53a, 56a of a diameter large enough to avoid their interference with the spindle 44 when the latter is driven by the drive system 58 to laterally oscillate the slender electrodes 1.

In the arrangement of FIG. 2, each of the motors 52 and 55 is arranged to be rotated reciprocatingly with a given angle of rotation which determines the amplitude of lateral oscillation of the electrodes 1 in the respective Y-axis and X-axis components of oscillation. When the two motors 52 and 55 are operated simultaneously, it will be understood that the electrodes 1 are circularly or elliptically oscillated laterally to cause the machining tip portion thereof to move oscillatorily along a small circular or elliptical path in a prescribed X-Y plane.

EXAMPLE

With an arrangement as generally shown in FIG. 2, the criticality of the rate of movement or velocity of a slender tool electrode when moved in lateral oscillation with a small amplitude was examined in a 3D EDM operation in accordance with the present invention. A workpiece was composed of a SKD 11 (Japanese Industrial Standard) steel and a slender tool electrode was composed of copper and had a diameter of 0.2 mm while the machining liquid was constituted by a water liquid having a specific resistance of $10^4$ ohm-cm. In testing, the slender tool electrode was laterally oscillated with an amplitude of 0.05 mm at various velocities while the electrode was displaced to sweep in a scanning manner three dimensionally or along a predetermined 3D path over the workpiece. In operation, the position of the electrode tip was servo-controlled to maintain the machining gap practically constant.

Figure 6:
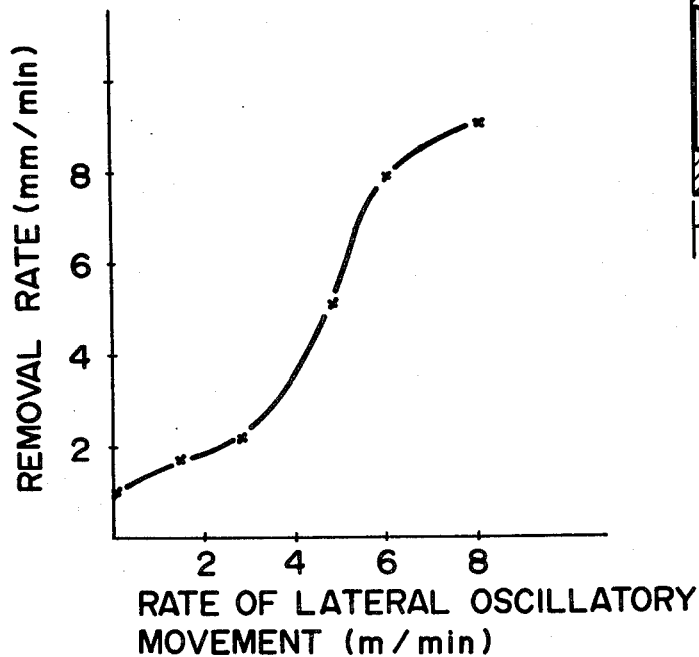
FIG. 6 is a graph showing the relationship between the rate of lateral oscillatory movement of the tip portion of the slender electrode and the EDM removal rate.

In FIG. 6 there is shown a graph representing the relationship between the rate of lateral oscillatory movement of the slender electrode and the removal rate derived from the examination. In the graph, removal rate (mm/min) is plotted along the ordinate and rate of movement is plotted along the abscissa. It is seen that removal rate sharply raises when the rate of lateral oscillatory movement exceeds 5 m/min or 8.3 cm/sec.

Figure 3:
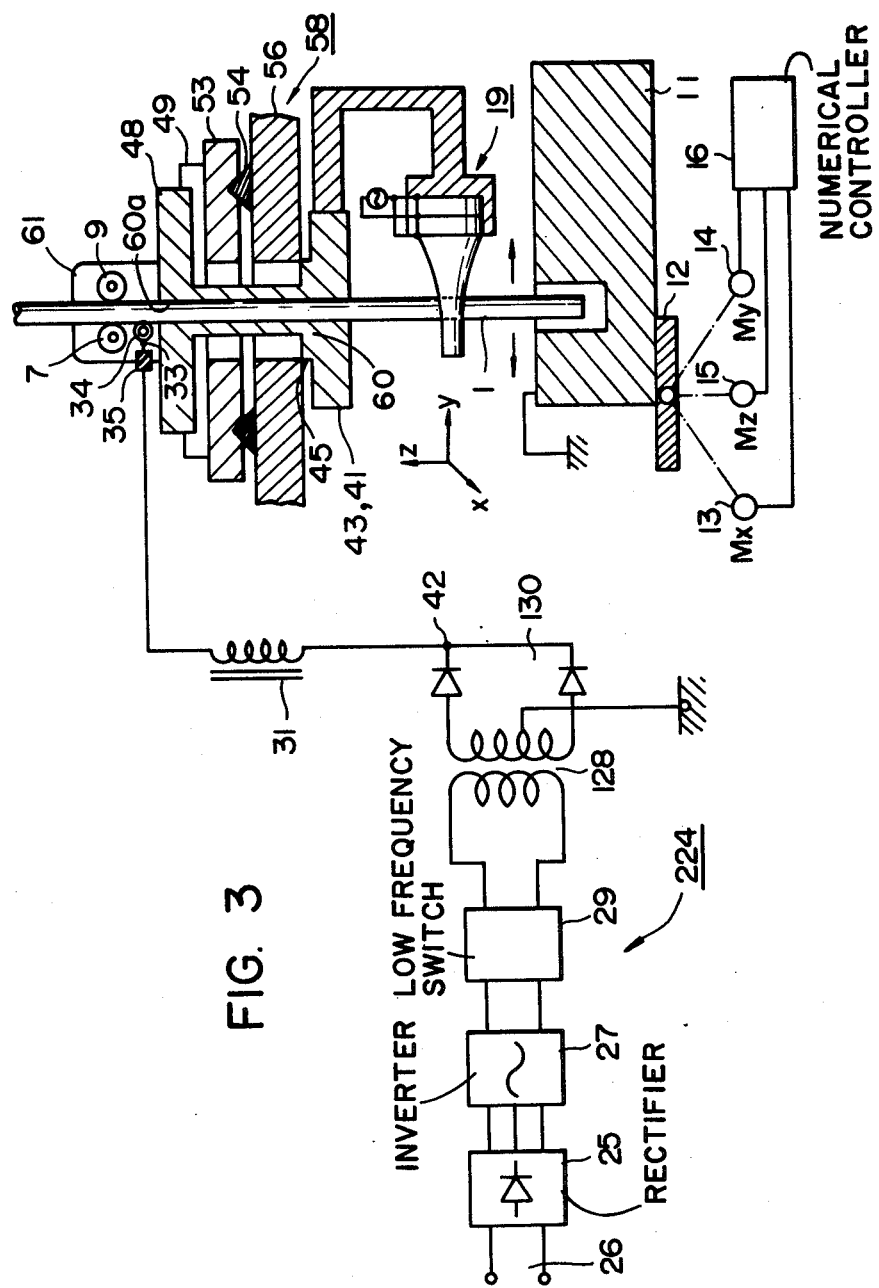
FIG. 3 is a schematic diagram illustrating a further form of apparatus according to the present invention.

FIG. 3 shows a further embodiment of the invention and includes reference numerals same as those in FIGS. 1 and 2 to designate the same or similar components previously described. This embodiment incorporates an ultrasonic vibration assembly 19 as shown in FIG. 1 and a motor drive unit 58 as shown in FIG. 2 for an alternative or simultaneous use. In this embodiment, the ultrasonic assembly 19 is securely supported by a shaft 60 by means of elements 41, 43 and 45, the shaft being securely held by the carriage 48. As in the arrangement of FIG. 3, the table 56 is fixedly mounted on the machine proper. The shaft 60 is formed with an internal bore 60a through which a continuous slender tool electrode 1, here again preferably tubular, passes slidably to come into juxtaposition with a workpiece 11. The drive table 48 has a support block 61 securely mounted thereon, which carries a capstan 7 and a pinch roller 9 whose functions have already been described. An EDM machining current is applied to the slender electrode 1 from a power supply 224 basically shown at 124 in FIG. 2 via brush 33 and conducting roller 34 as already described.

The arrangement of FIG. 3 may be used advantageously to impart to one or more slender electrodes 1 a lateral oscillatory movement in dual mode. Thus, the assembly 58 may operate to produce a vibration at a high frequency, say 50 kHz to 1 MHz, whereby to cause the electrode 1 to laterally oscillate at a higher rate while the assembly 58 may operate to produce a reciprocation at a lower frequency, say 1 to 50 kHz, whereby to cause the electrode 1 to laterally oscillate at a low rate. This mode of operation offers a greater stability of machining operation and a further enhanced machining efficiency.

Figure 4:
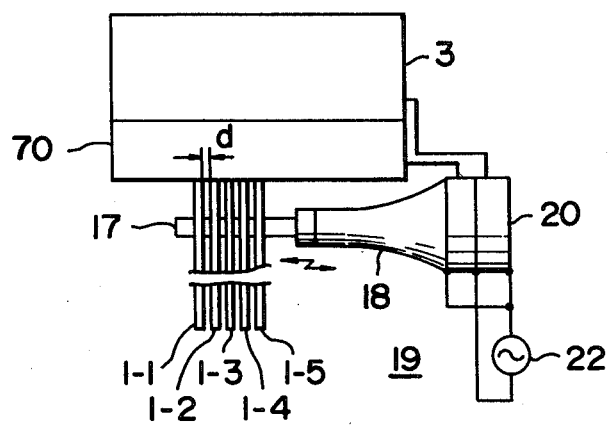
FIG. 4 is a schematic view of a plurality of electrode elements constituting a said slender tool electrode and arranged to be laterally oscillated in unison by a horn amplifier-type sonic or ultrasonic vibrator according to the invention.

In FIG. 4, there is shown a multiple electrode tool assembly 1 comprising a multiplicity of tubular elementary electrodes 1-1, 1-2, 1-3, 1-4 and 1-5 as hereinbefore described. These electrodes should, as hereinbefore described, be of a thickness (outer diameter) not greater than 1 mm, preferably at most 0.5 mm and are preferably composed of copper or brass. These tubular electrodes are arranged in parallel with one another, and, in mutually insulating relationship, secured to a support plate 70. In the arrangement shown, the elementary electrodes 1-1, 1-2, 1-3, 1-4 and 1-5 have a bar 17 secured thereto, the bar being attached to the tip of a horn body 18 which is supported from a tool head 3. In this system, an electromechanical transducer 20 is secured to the horn 18 and is energized by a high-frequency power supply 22 to produce a sonic or ultrasonic vibration therein which is amplified by and transmitted through the horn and the bar 17 to laterally oscillate the slender elementary electrodes 1-1, 1-2, 1-3, 1-4 and 1-5 in unison with a small amplitude. The amplitude of the oscillation may be adjusted to be slightly in excess of the uniform spacing d between the adjacent elementary electrodes 1-1 to 1-5. A further ultrasonic assembly of the same design, though not shown, is provided to vibrate the electrodes in the direction normal to the direction of oscillation effected by the assembly 19.

What is claimed is:

1. A method of electroerosively machining a three-dimensional cavity in a workpiece, comprising the steps of:

axially juxtaposing a slender tool electrode of which the shape is generally independent of the shape of the desired cavity with the workpiece to define between a tip portion of the slender electrode and the workpiece a machining gap flooded with a machining liquid;

laterally oscillating said slender electrode to cause said tip portion to oscillatorily move with a small amplitude in a plane substantially normal to the axis of said slender electrode;

effecting a succession of electrical discharges between said laterally oscillating tip portion and the workpiece through said liquid flooded machining gap to electroerosively remove material from the workpiece; and effecting a three-dimensional relative displacement of the axis of the laterally oscillating slender electrode and the workpiece to cause said oscillatorily moving tip portion to sweep in a scanning manner three-dimensionally over the workpiece while maintaining said machining gap therebetween substantially constant in size.

2. The method defined in claim 1 wherein the rate of the lateral oscillatory movement imparted to said tip portion ranges in excess of 5 meters/minute.

3. The method defined in claim 2 wherein said slender tool electrode has a thickness ranging between 0.05 and 1 mm.

4. The method defined in claim 3 wherein said slender tool electrode is tubular and formed with an internal bore open to said machining gap, further comprising the step of pumping said machining liquid into said internal bore and delivering it through said tubular electrode into said machining gap at a pressure in excess of 10 kg/cm².

5. The method defined in claim 4 wherein said pressure is in excess of 30 kg/cm².

6. The method defined in claim 5 wherein said pressure is in excess of 50 kg/cm².

7. The method defined in claim 4 wherein said machining liquid is a liquid water having a specific resistance ranging between $10^3$ and $10^5$ ohm-cm.

8. The method defined in claim 4 wherein said slender electrode is continuous, extending between said open-ended tip portion thereof and a supply thereof remote from said machining gap, said method further comprising the step of axially advancing said continuous electrode from said supply to compensate for the wear of said tip portion while maintaining said machining gap substantially constant.

9. The method defined in claim 1 wherein said tool electrode is constituted by a plurality of slender electrode elements arranged in parallel with one another and securely held together.

10. The method defined in claim 9 wherein said parallel electrode elements are spaced from one another with a distance between the adjacent elements ranging between 0.05 and 0.5 mm.

11. The method defined in claim 10 wherein said electrode elements individually have a thickness ranging between 0.05 and 1 mm.

12. The method defined in claim 10 wherein said distance is about one-half the thickness of each of said electrode elements.

13. The method defined in claim 10 wherein each of said electrode elements is tubular and formed with an internal bore open to said machining gap, further comprising the step of pumping said machining liquid into said internal bores and delivering it through said tubular electrode elements into said machining gap at a pressure in excess of 10 kg/cm².

14. The method defined in claim 1 wherein said slender electrode is laterally oscillated so as to oscillatorily move said tip portion two-dimensionally substantially in a plane normal to the axis of said slender electrode juxtaposed with the workpiece.

15. An apparatus for electroerosively machining a 3D cavity in a workpiece, comprising:
a slender tool electrode of which the shape is generally independent of the shape of a desired cavity and adapted to be juxtaposed with a workpiece to form a machining gap flooded with a machining liquid;
means for laterally oscillating said slender electrode to cause said tip portion to oscillatorily move with a small amplitude in a plane substantially normal to the axis of the slender electrode;
power supply means electrically connectable to said slender electrode and said workpiece for effecting successive electrical discharges between said oscillatorily moving tip portion and said workpiece through the liquid flooded machining gap to electroerosively remove material from the workpiece; and
feed means for effecting a three-dimensional relative displacement of the axis of the laterally oscillating slender electrode and the workpiece to cause said tip portion to oscillatorily sweep in a scanning manner three-dimensionally over the workpiece while maintaining said machining gap substantially constant in size.

16. The apparatus defined in claim 15 wherein said oscillating means is adapted to oscillatorily move said tip portion at a rate of movement in excess of 5 m/min.

17. The apparatus defined in claim 16 wherein said slender tool electrode has a thickness ranging between 0.05 and 1 mm.

18. The apparatus defined in claim 17 wherein said slender tool electrode is tubular and formed with an internal bore open to said machining gap, further comprising means for pumping said machining liquid into said internal bore and delivering it through said tubular electrode into said machining gap at an elevated pressure.

19. The apparatus defined in claim 18 wherein said tubular electrode is continuous, extending between said open-ended tip portion thereof and a supply therefor remote from said machining gap, further comprising electrode feed means for axially advancing said continuous electrode from said supply to compensate for the wear of said tip portion while maintaining said machining gap substantially constant.

20. The apparatus defined in claim 15 wherein said tool electrode is constituted by a plurality of slender electrode elements arranged in parallel with one another and securely held together.

21. The apparatus defined in claim 20 wherein said parallel electrode elements are spaced apart from one another with a distance between the adjacent elements ranging between 0.05 and 0.5 mm.

22. The apparatus defined in claim 21 wherein said electrode elements individually have a thickness ranging between 0.05 and 1 mm.

23. The apparatus defined in claim 21 wherein said distance is about one-half the thickness of each of said electrode elements.

24. The apparatus defined in claim 21 wherein each of said electrode elements is tubular and formed with an internal bore open to said machining gap, further comprising means for pumping said machining liquid into said internal bores and delivering it through said tubular electrode elements into said machining gap at an elevated pressure.

25. The apparatus defined in claim 15 wherein said oscillating means comprises at least one horn amplifier oriented transversely to the axis of said slender electrode and having an electromechanical transducer secured thereto and energizable by a high-frequency power supply.

26. The apparatus defined in claim 25 wherein two such horn amplifiers are provided and oriented in directions substantially orthogonal to one another.

* * * * *